July 31, 1962  B. MAXWELL  3,046,603

METHOD AND APPARATUS FOR EXTRUSION

Filed Dec. 15, 1958  5 Sheets-Sheet 1

INVENTOR
BRYCE MAXWELL
BY
Moses, Nolte, & Nolte
ATTORNEYS

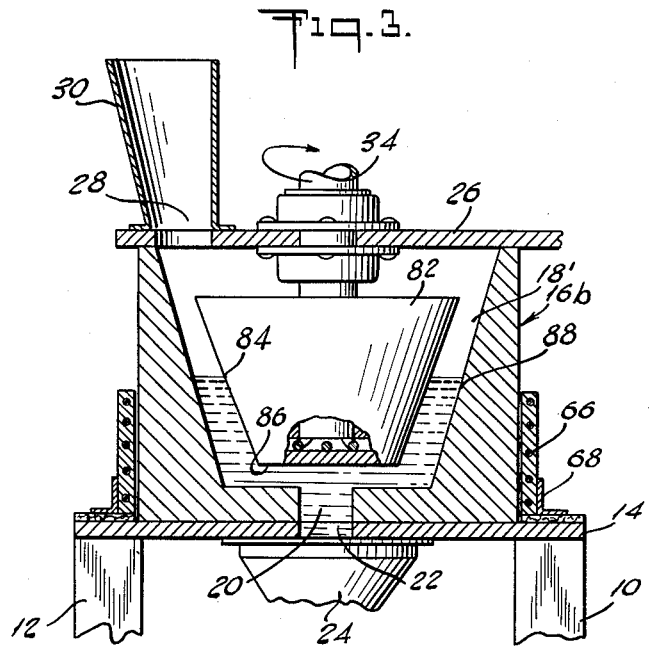
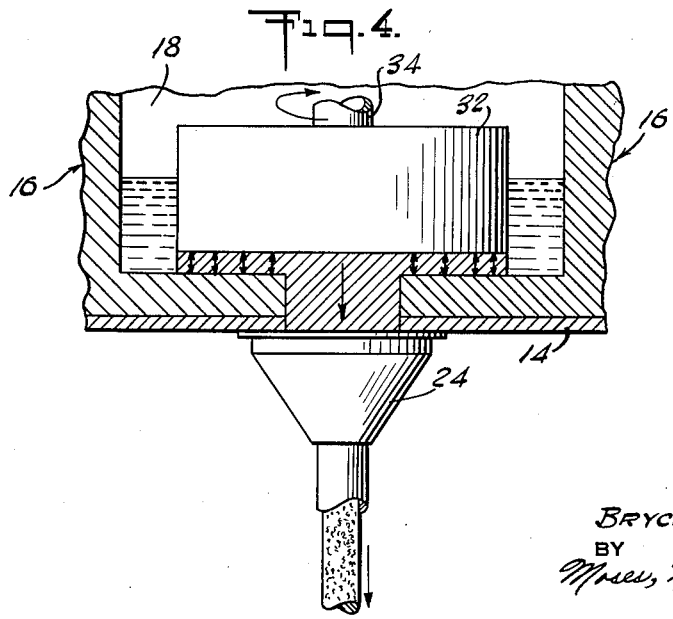

July 31, 1962 B. MAXWELL 3,046,603
METHOD AND APPARATUS FOR EXTRUSION
Filed Dec. 15, 1958 5 Sheets-Sheet 3

INVENTOR
BRYCE MAXWELL
BY
Moses, Nolte, & Nolte
ATTORNEYS

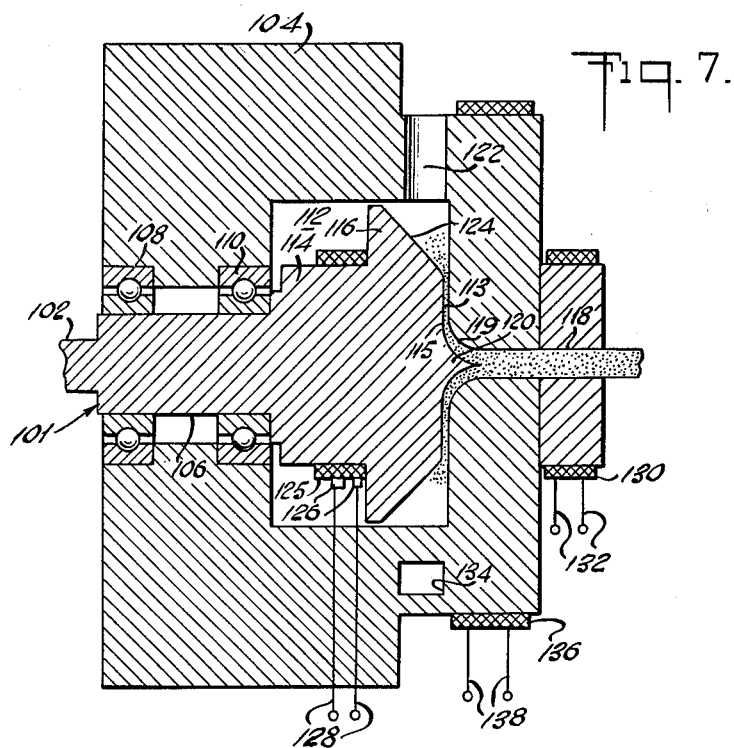
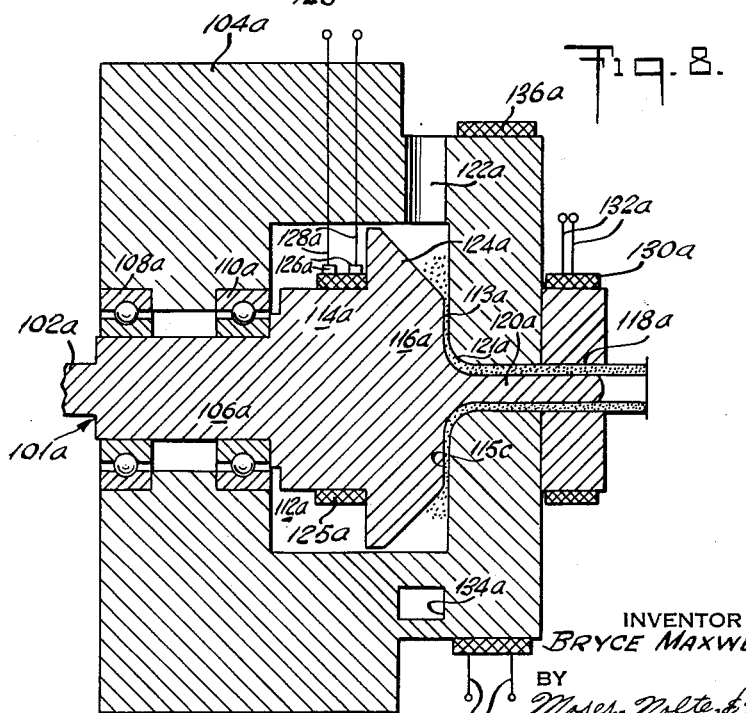

July 31, 1962  B. MAXWELL  3,046,603
METHOD AND APPARATUS FOR EXTRUSION
Filed Dec. 15, 1958  5 Sheets-Sheet 5

INVENTOR
BRYCE MAXWELL
BY
Moses, Nolte, & Nolte
ATTORNEYS

United States Patent Office 3,046,603
Patented July 31, 1962

3,046,603
METHOD AND APPARATUS FOR EXTRUSION
Bryce Maxwell, Princeton, N.J., assignor to Research Corporation, New York, N.Y., a corporation of New York
Filed Dec. 15, 1958, Ser. No. 780,352
27 Claims. (Cl. 18—12)

This application is a continuation-in-part of applicant's prior application Serial No. 716,918, filed February 24, 1958, now abandoned.

The present invention relates in general to extrusion and particularly to new and useful apparatus for, and to a method of, extruding visco-elastic materials.

The extrusion of materials, as contemplated by this invention, includes mixing, compounding and transporting of materials, as well as changing the condition or state of materials by the addition of heat or pressure. The invention presents a practical apparatus and method based on the discovery, that when a cup containing certain liquids is rotated about a cylindrical axis, and a stationary plate is immersed in the liquid, a vertical force is exerted on the plate in a direction away from the bottom wall of the cup. This unusual effect is produced when visco-elastic liquids are used.

The invention in its broadest aspect provides an apparatus and method for utilizing the force produced by the rotation described above to pump visco-elastic liquids. An apparatus for effecting pumping in accordance with this invention comprises in its simplest form a hollow container having an exit in a wall thereof and a power source for rotating a substantially cylindrical member at a fixed location closely spaced from the wall provided with the exit opening. The apparatus includes means to hold the rotating member against displacement and utilize the force produced in the liquid to discharge the liquid through the opening in the wall of the container.

In accordance with another aspect of the present invention, apparatus is provided for the controlled heating and pressure extrusion of a material such as a plastic, a polymer or the like. The apparatus includes a large cup-shaped container in which is placed either a plastic liquid to be extruded, or solid plastic pellets to be heated to a visco-elastic liquid form and extruded. A cylindrical member is arranged in the container to rotate with its lower surface close to the bottom surface of the cup. The rotation of the cylindrical member is used to agitate and heat the material as well as extrude it out an opening in the bottom of the cup. The apparatus includes additional heating elements to obtain the desired consistency for the extrusion of the material involved, in those instances where the material is not heated sufficiently by friction caused by rotation of the cylindrical member. The cylindrical member of the invention is held against displacement so that the force exerted on the under side thereof which results from the effect described supra is utilized effectively to pump the polymer melt through an extrusion die orifice. The rate of extrusion depends upon the speed of rotation of the member and the viscosity of the melt being extruded.

In accordance with another aspect of the invention, there is provided a method of extruding plastic materials by placing them in a cup-container and rotating a cylinder adjacent the bottom face thereof to effect the extrusion.

A machine constructed in accordance with the invention may be used for such things as mixing, compounding and extrusion of materials such as, for example, bread dough or the like, or it may be used for such things as the mixing of materials under controlled heat conditions such as, for example, the compounding of various plastic compositions. The invention also finds use in such fields as the control of the molecular weight of certain plastic materials by the shearing and extrusion action achieved by the apparatus.

In accordance with another embodiment of the invention there is provided apparatus for extruding plastic materials of various shapes such as pipes and including a simple attachment for reinforcing such extruded materials. Machines constructed in accordance with the invention may be used to blow the extrudate into large films as it is being extruded by providing a hollow rotating member with a central high pressure discharge directed into the center of the extruded material.

Accordingly, it is an object of this invention to provide a new and useful extrusion apparatus and a method of extruding plastics.

A further object of the invention is to provide an extrusion apparatus including a closed cup in which a cylindrical member is rotated adjacent the bottom face thereof to effect extrusion of a polymer material.

A further object of the invention is to provide an extrusion apparatus which is simple in design, rugged in construction, and economical to manufacture.

In the drawings:

FIG. 3 is a transverse section similar to FIG. 1 and showing still another embodiment of the invention;

FIG. 4 is a view similar to FIG. 1 indicating the details of the extrusion force effect produced by the rotation of the cylindrical member;

FIG. 7 is a transverse section of another embodiment of the invention;

FIG. 8 is a transverse section of another embodiment of the invention indicating an elongated rotor tip construction for extruding plastic pipe;

Figure 9:
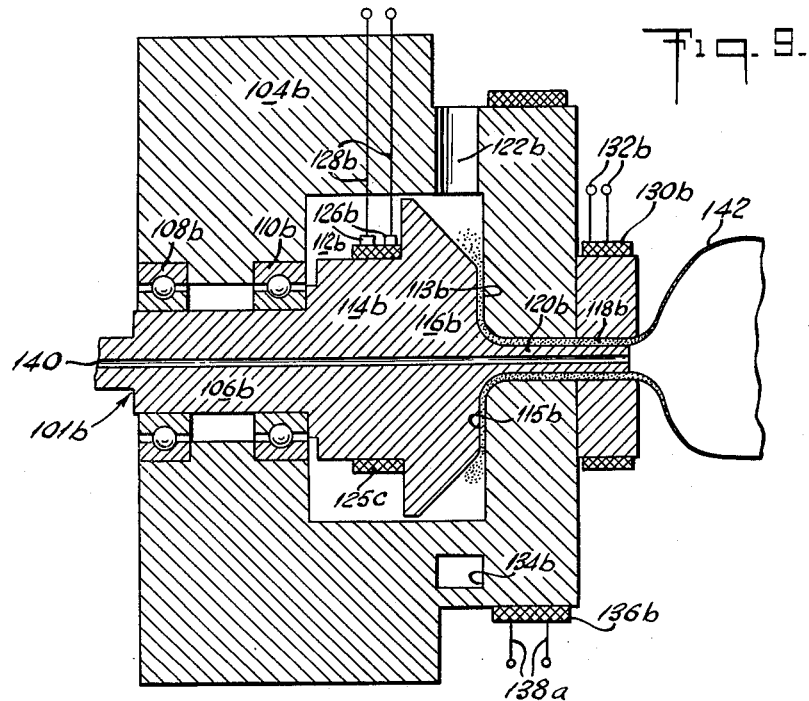
Figure 10:
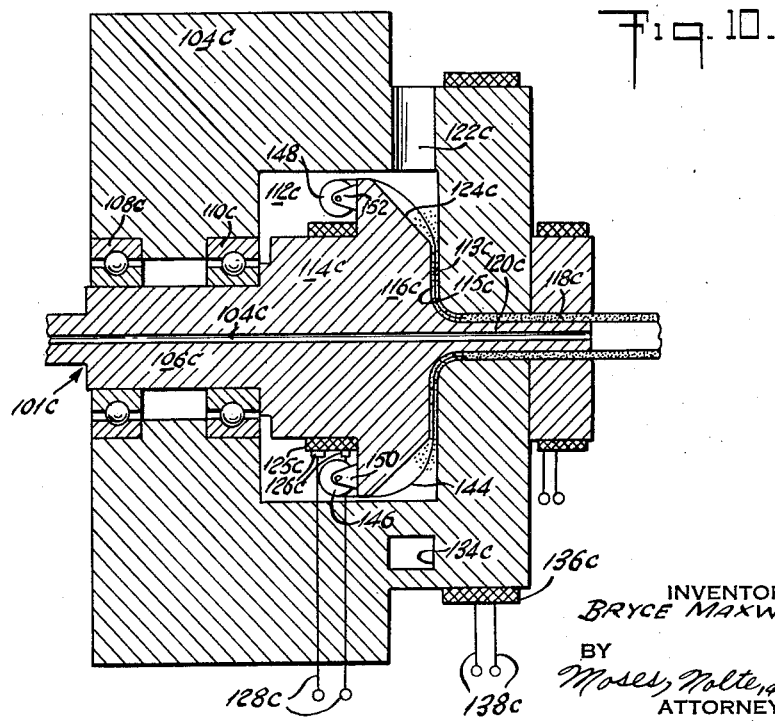

FIG. 9 is a transverse section similar to FIG. 8 of another embodiment of the invention indicating a rotor construction having an interior passage for directing materials such as wire to be coated into an area of the extrudate, or for blowing air or gas into the area of the extrudate to form a blown film; and FIG. 10 is a transverse section similar to FIGS. 8 and 9 but indicating a device for extruding reinforced pipe.

Referring to the drawings in particular, the invention as embodied therein includes spaced supporting frame members 10 and 12 carrying a base plate 14 which supports an extrusion container generally designated 16. The extrusion container 16 is hollowed to form a cylindrical extrusion chamber 18. The bottom of the container 16 and the base plate 14 are provided with vertically aligned openings 20 and 22 through which the material being extruded is directed. The material is passed from the opening 22 through an extrusion die 24.

The extrusion container 16 is provided with a cover 26 having an opening 28 on one side thereof which is in communication with a material supply hopper 30 mounted on the top of the cover.

In accordance with the invention, there is provided a cylindrical member 32 which is affixed to a shaft 34. The shaft 34 is mounted in suitable bearing 36 in the cover 26 and is constantly rotated by an electric motor 38 through a pair of bevel gears 40 and 42. The motor 38 is mounted partially on the cover 26 and partially on a laterally extending side bracket 44 affixed to the extension container 16.

A heating element 46 is positioned within the cylindrical member 32 adjacent a bottom face 48. The heating element is electrically connected by a pair of wires 50 and 52 through slip rings 54, positioned on the shaft 34 above the bearings 36 and below the bevel gear 42. The slip rings 54 are constantly engaged by a pair of contact members 56 and 58 which are supplied through a junction box 60 with a suitable source of electric current (not shown).

The heating element 46 is provided to heat the plastic material to a temperature which will give it the desired consistency for extrusion. In cases where additional heat for the material to be extruded is necessary, as where solid plastic pellets 64, which are fed into the hopper 30 must be heated to a liquid form, an additional heater 66 is provided. The heater 66 extends around the extrusion container 16 and is held in place at this location by a bracket 68.

The method of extrusion is as follows: The plastic pellets 64 or other materials of a similar nature are fed to the cup 16 through the hopper 30. The heating element 66 is then turned on to melt the pellets into a liquid mass. Motor 38 is started, and the heating element 46 is turned on. The motor 38 effects rotation of the shaft 34 and the cylinder 32. This rotation causes the liquid between the bottom face 48 and the bottom of the extrusion container 16 to become sheared. As the rotational speed is increased, the shearing stress is increased, and a force normal to this stress is developed. This area of shear and force development is indicated by the shaded area in FIG. 4. Since the cylindrical member 32 is anchored against vertical displacement the force developed effects the pumping and extrusion of the polymer material out through the extrusion die 24. The force developed to produce the extrusion results from a centripetal pumping action and this action produces sufficient force on the polymer material to effect this extrusion.

The centripetal pumping action and the extrusion of the material can be described by reference to FIG. 4, considering any point on the surface of the rotor 32 and any point on the bottom of the extrusion container 16 vertically aligned therewith. These two points are joined together by a visco-elastic liquid. When the cylindrical member 32 is rotated the point adjacent the member 32 will move in the direction of rotation. Since the liquid is visco-elastic the movement of the liquid may be considered to be similar to the stretching of a rubber band. This produces a movement of some of the material toward the center of rotation and the build up of a force normal to the rotational shearing, thus giving the desired pumping and extrusion performance indicated.

If desired, sufficient heating can be obtained by the friction caused by rotation of the cylindrical member 32 without the use of any electrical heating elements. Heating by this method can be controlled by incorporating a valve (not shown) at the discharge end of the extrusion die 24 which, by regulating the flow of the extruded material can indirectly effectively control its temperature.

Figure 2:
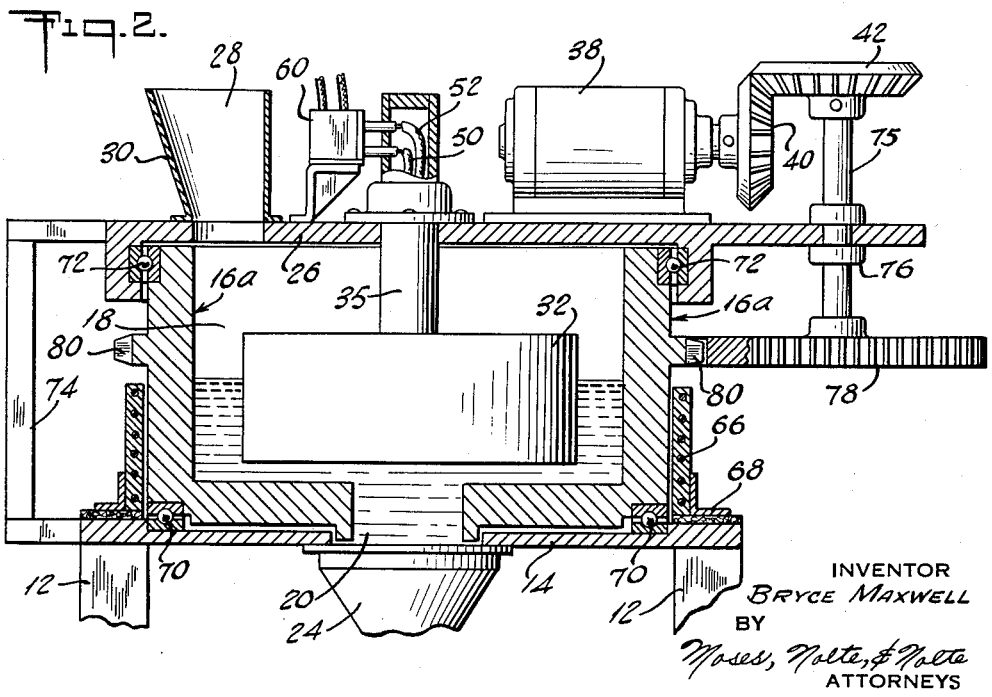
FIG. 2 is a transverse section similar to FIG. 1 but indicating another embodiment of the invention.

In the embodiment shown in FIG. 2, an extrusion container 16a is mounted in bearings 70, 70 in the base plate 14 and bearings 72, 72 in the cover 26, and both the cover 26 and the base plate 14 are secured against rotation, the former by securing brackets 74 which are connected from a cover 26 to the frame 12. In this embodiment the motor 38 drives through the gears 40 and 42 as before, but the gear 42 is mounted on a shaft 75 arranged for rotation in suitable bearings 76 in the cover 26. The opposite end of the shaft 75 is connected to a gear 78 which meshes with a large gear 80 formed on the outside periphery of the extrusion container 16.

In the embodiment of FIG. 2 there is no necessity for the slip rings 54, since the post 35 does not rotate. The heating element in the cylindrical member 32 is connected through the wires 50 and 52 directly to the junction box 60.

Figure 1:
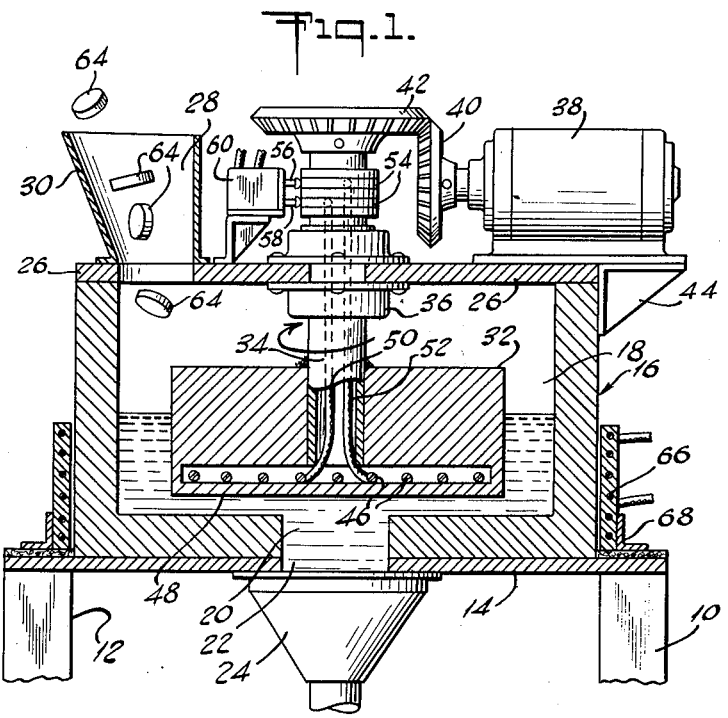
FIG. 1 is a transverse section of an extrusion apparatus constructed in accordance with this invention.

The embodiment shown in FIG. 3 is similar to that shown in FIG. 1, with the exception than the extrusion container 16b is hollowed to form an interior frusto-conical section 18'. In this embodiment a frusto-conical rotating member 82 is used instead of the cylindrical rotating member 32. The construction indicated in FIG. 3 produces effective normal shearing forces along a side 84 of the frusto-conical member as well as a bottom face 86. The plane of the frusto-conical side face 84 makes an acute angle with the plane of the frusto-conical side face 88 of the cup-shaped member 16. The space between the surface 84 and the surface 88 is filled with a visco-elastic liquid. The resistance of the material through configurational distortion will cause a movement of the fluid in a downward direction to reduce the configurational strain. It is possible with this embodiment to make the member 82 conical instead of frusto-conical.

Figure 5:
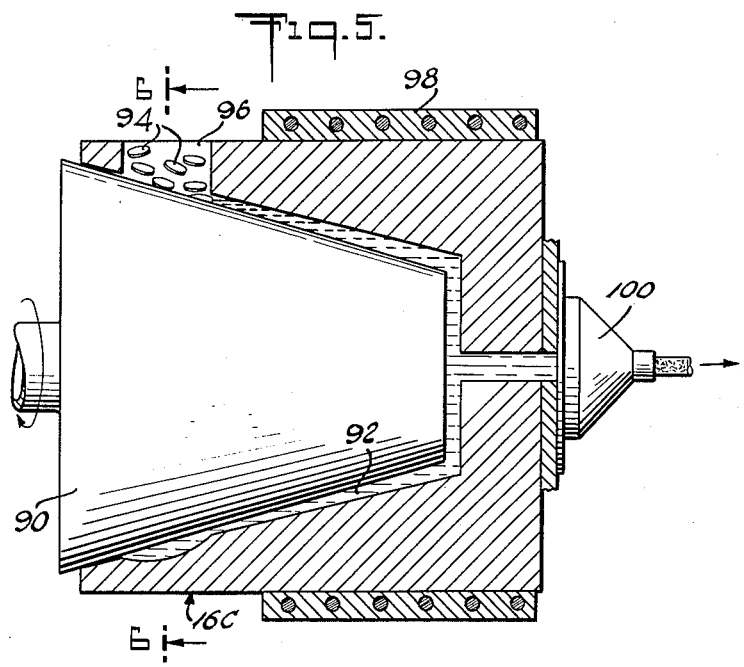
FIG. 5 is a transverse section similar to FIG. 1 but showing another embodiment of the invention for extruding horizontally.
Figure 6:
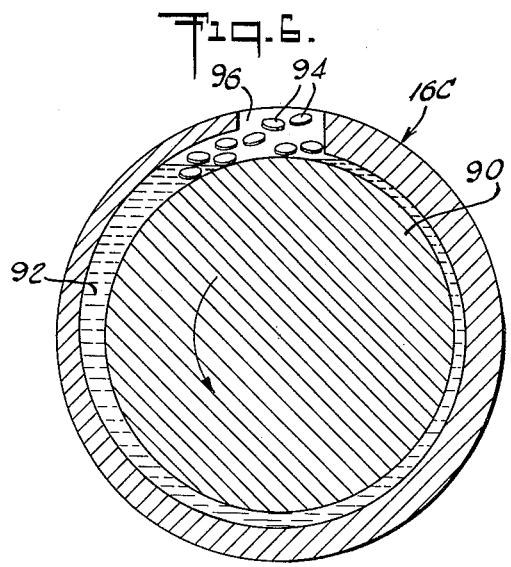
FIG. 6 is a sectional view taken on the line 6—6 of FIG. 5.

In the embodiment shown in FIG. 5, extrusion is made in a horizontal direction. The rotor is a frusto-conical member 90 and the extrusion container 16c is hollowed to form an interior frusto-conical chamber 92, as indicated in FIG. 6. Plastic pellets 94 are fed through an opening 96 in the top of extrusion container 16. The interior of the container 16 is cut away adjacent the inlet. An electric heater 98 is provided to produce the desired extrusion consistency. When the rotor 90 is rotated the material is extruded horizontally through an extrusion die 100.

In the embodiment shown in FIG. 7 extrusion is made in a horizontal direction of a material such as polyethylene. In this embodiment, there is provided a rotor generally designated 101 having a cylindrical shaft portion 102 which is connected to power means (not shown) to continuously rotate the rotor within a cylindrical housing 104. The rotor is provided with a widened portion 106 which is supported by spaced roller bearings 108 and 110 within a small diameter hollowed portion of the housing 104. The housing 104 also is provided with a hollowed interior portion defining a cylindrical chamber 112 of greater diameter than the widened portion 106 of the rotor 101, to accommodate an intermediate larger diameter rotor portion 114 and an umbrella-shaped portion 116 which forms the end of the rotor 101. The end of the housing 104 is provided with a flat wall 113 which is slightly spaced from a straight end face 115 of the rotor 101 to define a gap therebetween preferably between $\frac{1}{32}''$ to $\frac{1}{8}''$. The wall 113 has an opening 118 which connects the interior portion 112 to the exterior of the device and through which material is extruded. The passageway 118 is tapered as at 119 adjacent to the hollowed interior portion 112 to accommodate a substantially conical tip 120 of the rotor 101.

The housing 104 is provided with a radial passageway 122 in which material to be extruded is fed. The passageway 122 communicates with the interior chamber 112 and material fed therethrough is directed downwardly along a sloping face 124 of the umbrella-shaped portion 116 of the rotor 101. The rotor 101 is rotated in the present instance at a speed of about 600 r.p.m. and the extrudate is directed, by the motion of the rotor 101 through the opening 118.

The apparatus includes a slip ring heater 125 which is affixed to the intermediate portion 114 of the rotor and is supplied with electrical energy through a slip ring brush set 126 which is energized through electrical connections 128. An additional annular heater 130 is provided on the forward end of the housing 104 adjacent the opening 118 in order to afford accurate temperature control of the extrudate. The heater 130 is energized through the electrical connections 132. The housing 104 is also provided with annular passage 134 into which a cooling medium such as air or water may be directed when the extrusion process requires it. An intermediate ring heater 136 is positioned around the housing and is energized through suitable electrical connections 138. The spaced ring heaters 124, 130 and 136 together with the passage 134 for cooling provides an apparatus in which the temperature may be accurately controlled over the complete extrusion process and throughout localized areas.

Using the equipment indicated in FIG. 7, extrusions have been made with various materials at various rotational speeds, gap sizes between walls 115 and 113 and temperatures.

Such materials as high density polyethylene, low density polyethylene, polystyrene and polypropylene have been successfully extruded in this equipment. For example, when using a low density polyethylene of a melt index of 6, the rotor 101 was operated with a gap between the wall 115 and the wall 113 of the interior chamber 112 of approximately 1/16″. The motor 101 was rotated at a speed of approximately 600 r.p.m. The temperature of the melt was maintained at approximately 400° F. It required a power of 1600 watts to drive the motor which rotated the rotor 101. Extrudate exited through the passage 118 at the rate of approximately 24 grams per minute.

The above data is cited as an example of an actual operating condition using the apparatus as indicated in FIG. 7. Successful extrusions have also been made with materials of from 0.6 to a 20 melt index. The gap sizes used during extrusion may be varied but preferable ranges are from about 1/32″ to 1/8″. While not limited thereto, the above apparatus has been operated successfully at rotational speeds of from 80 to 600 r.p.m. and over a melt temperature range of from 260° F. to 480° F.

Pressures in the extrusion die up to 125 lbs. per square inch have been measured. Rates of extrusion of up to 6½ lbs. per horsepower hour have been made. None of the above ranges or variables should be considered as limits and are given only as examples of the ranges employed in the operation of the apparatus indicated in FIG. 7.

In FIGS. 8 to 10 there are illustrated modified embodiments of extruders similar to that indicated in FIG. 7. For convenience, the parts which are substantially identical are given the same numerical designation with the addition of a letter suffix for each embodiment. FIG. 8 indicates an extruder in which the rotor 101a is provided with an elongated cylindrical tip 120a instead of the conical tip 120. When the material is extruded it flows through a beveled outlet 121a and around the elongated cylindrical extension 120a of the rotor 101a. The elongated cylindrical extension 120a is of slightly less diameter than the passage 118a so that the material is extruded as a plastic pipe having a hollow interior.

A further modification is indicated in FIG. 9 in which a rotor 101b is provided with a central internal passage 140 which is connected to a source of air pressure to direct air under pressure through the passage into the path of material being extruded around the elongated cylindrical extension 120b of the rotor 101b. The extension 120b is substantially the same size as the extension 120a of the previous embodiment so that the material being extruded forms initially in the shape of a small diameter hollowed tube or pipe. Air which is directed through the passage 140 effects the formation of the extruded material into a blown film 142 of greatly increased diameter from the initially formed tube.

A further modification of the extrusion equipment is indicated in FIG. 10 which includes a rotor 101c which is similar to the rotor 101b. The material which is fed through the passageway 122c is extruded in the form of a hollowed tube around the elongated extension 120c, but in the present instance the extruded tube is reinforced by a reinforcing strand 144 of fiber, metal or other similar material. The reinforcing strand 144 is fed off a pair of diametrically opposite spools 146 and 148 which are rotatably mounted on brackets 150 and 152, respectively. The brackets 150 and 152 are affixed to the inner face of the umbrella portion 116c. As the rotor 101c is rotated, the reinforcing fibers 144 are fed outwardly around the edge of the umbrella portion 116 into communication with the extrudate and are interwoven therewith to effect a reinforced plastic pipe. Since the extrudate does not rotate but the spools 146 and 148 do, the result is a spiral winding of the strand throughout the material which is extruded.

It should be realized that while embodiments of the invention for extruding plastic materials in various shapes have been indicated and described, there are many other materials which can be beneficially treated and extruded in the apparatus as described or as modified in accordance with the invention principles. For example, bread dough may be mixed and compounded in such equipment. Such material as polyvinyl chloride may be compounded with a plasticizer such as dioctyl-phthalate in such equipment since it is ideally suited for adding heat as well as mixing intimately, a requisite to cause the polymer to go into solution with the plasticizer. The equipment may be used for the control of polymer molecular weight by shearing and extrusion. For example, the degradation by shear of polypropylene in order to produce a uniform lower molecular weight material may be accomplished with this apparatus.

It has also been found possible to utilize the apparatus for the chemical cross linking of polymers concurrently with their extrusion. For example, the cross linking of a polyethylene with a dicumylperoxide to form a cross linked extrudate may be accomplished with such apparatus. The apparatus may also be used where it is desired to expose the material to a minimum amount of heat during extrusion. For example, the extrusion of polyethylene may be accomplished with exposure to heat in the machine of about only 7.2 seconds as compared to one or two minutes in the conventional type equipment.

The apparatus may also be used for graft-polymerization and extrusion by mixing and shearing a feed of polymer and monomer. For example, the grafting of methyl methacrylate onto polypropylene may be accomplished with this apparatus.

In apparatus such as indicated in FIGS. 9 and 10 a material such as wire may be coated with a linear or cross linked polymer by feeding the wire to be coated directly through the center of the rotor such as through the passage 140, into the stream of the material being extruded. The apparatus indicated in FIG. 9 may also be used to apply a vacuum at the location of the extrusion and effect devolatilizing of polymers and their extrusion by the application of a vacuum to the feed section.

Thus the invention provides an inexpensive and simple apparatus for the effecting of efficient extrusion of visco-elastic materials. The apparatus permits operation with little power for effecting the extrusion, and provides an apparatus in which the extrusion consistency and rate of extrusion are easily controlled.

While a specific embodiment of the invention has been shown and described in detail to illustrate the application of the invention principles, it will be understood that the invention may be embodied otherwise without departing from such principles.

What is claimed is:

1. Apparatus for extruding a visco-elastic plastic material comprising, a cup member having an opening in the bottom thereof for the exit of material being extruded, die means communicating with said opening for forming the desired extruded shape, a substantially impervious rotating member having a fixed axis of rotation positioned in said cup and having a substantially flat bottom face positioned substantially parallel and in proximity to the bottom of said cup, and means to rotate said member on its axis to shear the plastic material between its bottom face and the cup member bottom at a rate sufficient to cause a centripetal force in excess of the centrifugal force on the material rotating therewith to thereby cause a flow of said material toward the axis of rotation.

2. An apparatus according to claim 1, wherein said cup is hollowed to define a cylindrical chamber, and said rotating member is positioned in said chamber with the sides and bottom walls thereof in substantially parallel alignment.

3. Apparatus for extruding a visco-elastic plastic material comprising, a rotating cup member having a substantially flat bottom with an opening in said bottom for the exit of material being extruded, die means communicating with said opening for forming the desired extruded shape, a supply of material to be extruded in said cup member, a substantially impervious member positioned within said cup member and having a substantially flat bottom face positioned substantially parallel and in proximity to the bottom of said cup member, and means to rotate said cup member whereby material is directed through the opening in said cup member and outwardly through said die means.

4. An apparatus for extruding a visco-elastic material according to claim 3, wherein said cup is hollowed to define a cylindrical chamber and said impervious member is positioned in said chamber with the side and bottom walls thereof in parallel alignment.

5. An apparatus for extruding a visco-elastic plastic material comprising a cup member having an opening in the bottom thereof for the exit of material being extruded, die means communicating with said opening, a supply of plastic material to be extruded in said cup member, a substantially impervious rotating member positioned in said cup member and having a bottom face substantially parallel to and in proximity to the bottom of said cup member, means to heat said material, and means to rotate said rotating member to shear said plastic material between the bottom face of said cup member and said rotating member at a rate sufficient to cause a centripetal force in excess of the centrifugal force on the material rotating therewith whereby material is directed toward the opening of the cup member and through said die means.

6. An apparatus according to claim 5 in which said rotating member is frusto-conical in shape.

7. An apparatus according to claim 6, wherein the walls of said frusto-conical rotating member and said cup are in planes making an acute angle with one another.

8. A method of extruding visco-elastic plastic material from a die communicating with an opening in a wall of a container comprising feeding the material into the container, heating said material to a visco-elastic consistency, rotating a surface adjacent the container wall having said opening without the clearance distance between any portion of the surface and the wall changing during said rotation to effect discharge and extrusion of the material through the opening and said die.

9. An apparatus for extruding visco-elastic plastic material comprising a container having a substantially flat bottom with an opening in said bottom for the exit of material being extruded, and an inlet remote from said exit, die means communicating with said opening, a substantially cylindrical rotating member fixedly positioned in said container with a substantially impervious bottom face positioned in substantially parallel proximity to the bottom of said container, and means to rotate said cylindrical member whereby material is discharged through the opening in the bottom of said container.

10. An apparatus for extruding a visco-elastic plastic material comprising, a container having a substantially flat wall with an opening therein for the exit of material being extruded, die means communicating with said opening, a substantially impervious rotating member positioned in said container and having a substantially flat face positioned in proximity to the wall of said container having the exit therein, and means to rotate said member whereby material is directed through the opening of said container.

11. An apparatus according to claim 10 wherein said exit is located in a side wall of said container.

12. An apparatus according to claim 10, wherein said rotating member is substantially frusto-conical and the smaller diameter end of said member is positioned parallel and in close proximity to said side wall.

13. An apparatus for extruding visco-elastic plastic material according to claim 12 including an inlet in said container remote from said outlet, said container's interior walls being of spiral configuration adjacent said inlet.

14. An apparatus for extruding a visco-elastic plastic material comprising a container having a substantially flat wall with an opening therein for the exit of material being extruded, die means communicating with said opening for producing the desired extruded shape, a substantially impervious rotating member arranged for rotation within said container and having a flat face positioned in substantially parallel proximity to said flat wall, said rotating member including a central tip portion which extends into the opening of said container, and means to rotate said member whereby material is directed through the opening of said container through said die means.

15. An apparatus according to claim 14, wherein said opening in said container is defined at the end of an elongated passage connecting the interior thereof, and said rotor tip includes an elongated portion which extends a substantial distance into said passage whereby to shape materials extruded through said passage into tubular configuration.

16. An apparatus for extruding visco-elastic plastic material, comprising a container having a flat interior wall defined therein and having a small elongated passage connecting said wall with the exterior of said container, a rotor rotatably mounted in said container and including a widened annular flat portion arranged to rotate within said chamber in close proximity to said wall, said rotor also including an elongated central portion which extends outwardly from said chamber into said elongated passage, and means to rotate said rotor for extruding material directed to said chamber outwardly through said opening.

17. An apparatus according to claim 16, wherein said rotor is provided with a hollow central passageway which is maintained under pressure to effect blowing of extruded material which exits from said passageway.

18. An apparatus according to claim 16, including means for feeding reinforcing strand material into said elongated passage during the rotation of said rotor, wherein said means includes a spool of such material affixed to said rotor and rotatable therewith, said material being directed off said spool into said opening whereby the strand material is spirally wound in said material being extruded.

19. An apparatus for extruding visco-elastic plastic material comprising a container including an internal chamber having a flat wall and an elongated passageway communicating with said wall and extending to the exterior of said container, a member mounted for rotation in said container, die means communicating with said elongated passageway for forming the desired extruded shape, and including a widened annular flat portion in close proximity to said wall, said member having a substantially umbrella-shaped portion positioned adjacent said elongated passage, a radially extending feed passage arranged to direct materials for extrusion against the sloping face of said umbrella-shaped portion of said rotating member, and means to rotate said rotating member whereby material fed therethrough is extruded through said elongated passageway and out said opening through said die means.

20. An apparatus according to claim 19 including a heater connected to said rotor behind said umbrella-shaped portion, and slip ring means to electrically energize said heater.

21. An apparatus according to claim 19 including a spool mounted on said rotor on the opposite side of said umbrella-shaped portion from the elongated passageway, and means for directing a strand from said spool into said passageway as material is being extruded therethrough and as said rotor is being rotated.

22. Apparatus according to claim 20, wherein the center of said rotor is hollowed.

23. Apparatus for extruding a visco-elastic plastic material comprising a cup member having an outlet opening in a wall thereof die means communicating with said opening for producing the desired extruded shape, a substantially impervious member positioned in said cup member with a wall thereof in substantially parallel spaced relation to the wall of the cup member having the outlet opening therein, and means for rotating one of said members about an axis substantially collinear with the axis of said opening wherein the shape of said cup member and said impervious member is such that upon rotation of one of said members the uniform spaced relation is maintained between said members.

24. A plastic extruder comprising an outer container member having an outlet in a substantially flat portion thereof, die means communicating with said outlet to form the desired extruded shape, a supply of visco-elastic plastic material within said container member, an inner member having a substantially flat portion opposite and substantially parallel to said outer container member flat portion and overlying said container member outlet, means for rotating one of said members about an axis substantially perpendicular to the plane of said flat portion, and means restaining axial movement of both of said members to maintain a substantially fixed distance therebetween during rotation whereby the plastic material in said container member is pumped through said outlet.

25. The method of extruding a visco-elastic plastic material through a die comprising the steps of supplying the material between a pair of spaced substantially congruent surfaces which surfaces are surfaces of revolution, rotating one of said surfaces relative to the other surface about an axis substantially perpendicular to said surfaces, maintaining a uniform clearance distance between said surfaces during said rotation, and discharging fluid through an outlet in one of said surfaces and said die by the centripetal pumping action caused by said rotating surfaces.

26. The method of extruding visco-elastic plastic material through a die comprising the steps of spacing two substantially congruent impervious surfaces in opposed proximate relation, directing the plastic material to be extruded to the outer peripheral portions of said spaced surfaces, and rotating one of said surfaces to shear the plastic material therebetween at a rate sufficient to cause a centripetal force in excess of the centrifugal force on the material therebetween to thereby cause a flow of plastic material in the space between the opposed surfaces toward the axis of rotation, and allowing the material so flowing to discharge through an outlet in one of said surfaces to said die whereby the desired extruded shape is formed.

27. An extruder for visco-elastic plastic materials comprising a first substantially impervious surface having an outlet opening therethrough, a second surface congruent with but spaced from said first surface, die means in communication with said outlet opening for forming the desired extruded shape, a supply of plastic material between said first and second surfaces, and means for relatively rotating said surfaces to shear the visco-elastic plastic material therebetween at a rate sufficient to cause a centripetal force in excess of the centrifugal force on the material therebetween to thereby cause a flow of the plastic material in the space between said first and said second surfaces toward the axis of relative rotation and outwardly through said outlet opening and die means.

References Cited in the file of this patent

UNITED STATES PATENTS

| | | |
|---|---|---|
| 1,689,312 | Williams | Oct. 30, 1928 |
| 2,564,880 | Colombo | Aug. 21, 1951 |
| 2,676,356 | Becker | Apr. 27, 1954 |
| 2,788,543 | Dinsch | Apr. 16, 1957 |
| 2,800,683 | Teichmann | July 30, 1957 |
| 2,885,739 | Staller | May 12, 1959 |
| 2,887,721 | Blanchi et al. | May 26, 1959 |
| 2,937,804 | Reiner et al. | May 24, 1960 |

FOREIGN PATENTS

| | | |
|---|---|---|
| 1,177,383 | France | Dec. 1, 1958 |
| 332,879 | Great Britain | July 31, 1930 |

OTHER REFERENCES

Weissenberg: Dr. K. Nature, v. 159, pp. 310 and 311, March 1, 1947.

Reiner: M/Proc. of the Royal Soc., A. vol. 247, pp. 152–167, January 16, 1958.